United States Patent
Cohen et al.

[19]

[11] Patent Number: 5,870,743
[45] Date of Patent: Feb. 9, 1999

[54] METHOD AND APPARATUS FOR PARALLELIZING OPERATIONS THAT CREATE A TABLE

[75] Inventors: Jeffrey I. Cohen, Mountain View; William H. Waddington, Foster City, both of Calif.; Daniel Leary, New Ipswich, N.H.; Jonathan Klein, Pleasanton, Calif.

[73] Assignee: Oracle Corporation, Redwood Shores, Calif.

[21] Appl. No.: 669,697

[22] Filed: Jun. 24, 1996

[51] Int. Cl.$^6$ .................................................. G06F 17/30
[52] U.S. Cl. ................................................. 707/8; 707/201
[58] Field of Search ................................ 707/8, 10, 202, 707/203, 2, 1, 200, 201, 100

[56] References Cited

U.S. PATENT DOCUMENTS

| | | | |
|---|---|---|---|
| 4,853,843 | 8/1989 | Ecklund | 364/200 |
| 5,222,235 | 6/1993 | Hintz et al. | 395/8 |
| 5,247,672 | 9/1993 | Mohan | 395/650 |
| 5,255,387 | 10/1993 | Arnold et al. | 707/8 |
| 5,265,245 | 11/1993 | Nordstrom et al. | 707/8 |
| 5,355,477 | 10/1994 | Strickland et al. | 707/8 |
| 5,485,607 | 1/1996 | Lomet et al. | 707/8 |
| 5,491,819 | 2/1996 | Fatzinger et al. | 707/8 |
| 5,499,367 | 3/1996 | Bamford et al. | 395/600 |
| 5,546,570 | 8/1996 | McPherson, Jr. et al. | 707/4 |
| 5,546,579 | 8/1996 | Josten et al. | 707/8 |
| 5,557,792 | 9/1996 | Josten et al. | 707/8 |
| 5,590,326 | 12/1996 | Manabe | 395/477 |
| 5,603,026 | 2/1997 | Demers et al. | 395/608 |
| 5,623,659 | 4/1997 | Shi et al. | 395/608 |
| 5,675,791 | 10/1997 | Bhide et al. | 395/621 |

OTHER PUBLICATIONS

Lee et al., "A Multi-granularity Locking Model for Concurrency Control in Object-Oriented Database Systems," IEEE Transactions on Knowledge and Data Engineering, vol. 8, No. 1, Feb. 1996.

Haldar et al., "A Dynamic Granularity Locking Protocol for Tree-Structrured Databases," IEEE Database, 1991.

Adve et al., "A Comparision of Entry Consistency and Lazy Release Consistency Implementations", IEEE Database, 1996.

Prasad et al., "Using Parallel Data Structures in Optimistic Discrete Event Simulation of Varying Granularity on Shared-Memory Computers", IEEE Database, 1995.

Fortier et al., "Simulation Analysis of Early Commit Concurrency Control Protocols", IEEE Database, 1995.

Dandamudi et al., "Locking Granularity in Multiprocessor Database Systems," IEEE Database, 1991.

*Primary Examiner*—Thomas G. Black
*Assistant Examiner*—Michael J. Wallace, Jr.
*Attorney, Agent, or Firm*—McDermott, Will & Emery

[57] ABSTRACT

A method and apparatus for parallelizing operations that change a database is provided. A coordinator process receives a statement that requires data to be written into the database. In response to the statement, the coordinator process assigns granules of work to multiple processes. Each of the multiple processes executes the granule of work by writing to the database a distinct portion of the set of data that is to be added to the database. The various portions of data are then merged to create the set of data to be added to the database.

20 Claims, 6 Drawing Sheets

METHOD AND APPARATUS FOR PARALLELIZING OPERATIONS THAT CREATE A TABLE

FIELD OF THE INVENTION

The present invention relates to parallelizing operations on a database, and more specifically, to parallelizing operations that create tables from data that already exists in a database.

BACKGROUND OF THE INVENTION

In typical database systems, users write, update and retrieve information by submitting commands or "queries" to a database application. To be correctly processed, the commands must comply with the database language that is supported by the database application. One popular database language is known as Structured Query Language (SQL).

Multi-processing systems are typically partitioned into nodes, where each node may contain multiple processors executing multiple concurrent processes. To fully utilize the computing power of a multi-processing system, a database application may divide a large processing task required by a query into smaller work granules which may then distributed to processes running on one or more processing nodes. Because the various work granules are being performed in parallel, the processing required by the query can be completed much faster than if the processing were performed on a single node by a single process. One mechanism for implementing parallel operations in a database management system is described in U.S. patent application Ser. No. 08/441,527 entitled "Method and Apparatus for Implementing Parallel Operations in a Database Management System" filed on May 15, 1995, by Gary Hallmark and Daniel Leary, incorporated herein by reference now abandoned and re-filed as Ser. No. 08/898,080.

Computer systems often contain resources that can only be accessed in a particular way by one process at a time. In database systems, such resources include sets of data, such as tables, rows, or objects, that can only be written by one process at a time.

Mechanisms have been developed which control access to resources. One such mechanism is referred to as a lock. A lock is a data structure that indicates that a particular process has been granted certain rights with respect to the resource. Before a process can perform an operation on a resource, the process is required to obtain a lock that grants to the process the right to perform the desired operation on the resource.

To perform a write operation on a set of data, a process typically must obtain an exclusive lock on the set of data. To obtain an exclusive lock, the process transmits a request for an exclusive lock to a lock manager associated with the set of data. A lock manager is a process that is responsible for granting, queuing, and keeping track of locks on one or more resources.

If the lock manager has already granted a lock on the resource to another process, or has already received a request for an exclusive lock from another process, then the lock manager process cannot grant the requested exclusive mode lock. Under such circumstances, a lock manager will typically place the lock request in a queue, and grant the request when the request is at the head of the queue and all outstanding locks on the resource have been released.

Unfortunately, the performance benefit gained by parallelizing a database operation is significantly diminished when the operation is divided into work granules that involve writing the same set of data. For example, consider the operation illustrated in FIG. 1, where a coordinator process 102 receives a query 104 that requires a block of data (DATA A–Z) to be generated and then inserted into a table 120 in a database 122.

The coordinator process 102 divides the query into work granules 106, 108 and 110, where each work granule calls for the generation and insertion of a subset of the set of data. In the illustrated example, work granules 106, 108 and 110 represent generate and insert operations for subsets A–G, H–Q and R–Z of data A–Z, respectively. The coordinator process 102 then distributes the work granules 106, 108 and 110 to processes 112, 114 and 116, respectively. Preferably, processes 112, 114 and 116 are executing on separate processors to allow maximum concurrency.

Because the work granules involve writing table 120, the processes must obtain an exclusive lock on table 120 before they can perform their assigned work granules. In the illustrated example, the exclusive lock for table 120 has been granted to process 116. Consequently, process 116 can proceed to perform work granule 110 by inserting subset of data R–Z into table 120. However, an exclusive lock can be held by only one process at a time. Therefore, processes 112 and 114 must wait for process 116 to release the exclusive lock for table 120.

When process 116 completes the performance of work granule 110, process 116 will release the exclusive lock for table 120. At this time, the exclusive lock may be granted to one of the other processes 112 and 114 waiting to write to table 120. The process that is not granted the exclusive lock must wait for the process that is granted the exclusive lock to complete its work granule and release the exclusive lock. When the last process has been granted the exclusive lock, the last process may finally perform the work granule assigned to the last process.

As is evident by the example described above, an attempt to parallelize an operation that involves writing a set of data in a database results in a serial operation, where each of the processes involved in the operation must simply await its turn to perform the portion of the operation that has been assigned to it. Such an attempt to parallelize a write operation may actually result in slower execution than if no attempt to parallelize is made, due to the increased overhead of task scheduling, inter-node communication, and lock management.

SUMMARY OF THE INVENTION

A method and apparatus for parallelizing operations that create a table in a database is provided. A coordinator process receives a statement that requires a table to be created in the database from data specified in a query. In response to the statement, the coordinator process assigns granules of work to two sets of processes. Each process in the first set of processes acquires a portion of the data required to make the table. Each process in the second set of processes writes a distinct segment of the table. The various segments are then merged to create the table.

According to one aspect of the invention, the segments are written directly to disk without generating undo logs. The segments are marked as temporary while they are being written. If an error occurs while writing the segments, the segments are deleted. If all of the segments are written without error, the segments are changed from temporary to permanent upon being merged to create the table.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for parallelizing a database operation that involves creating a table in a database are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 2:
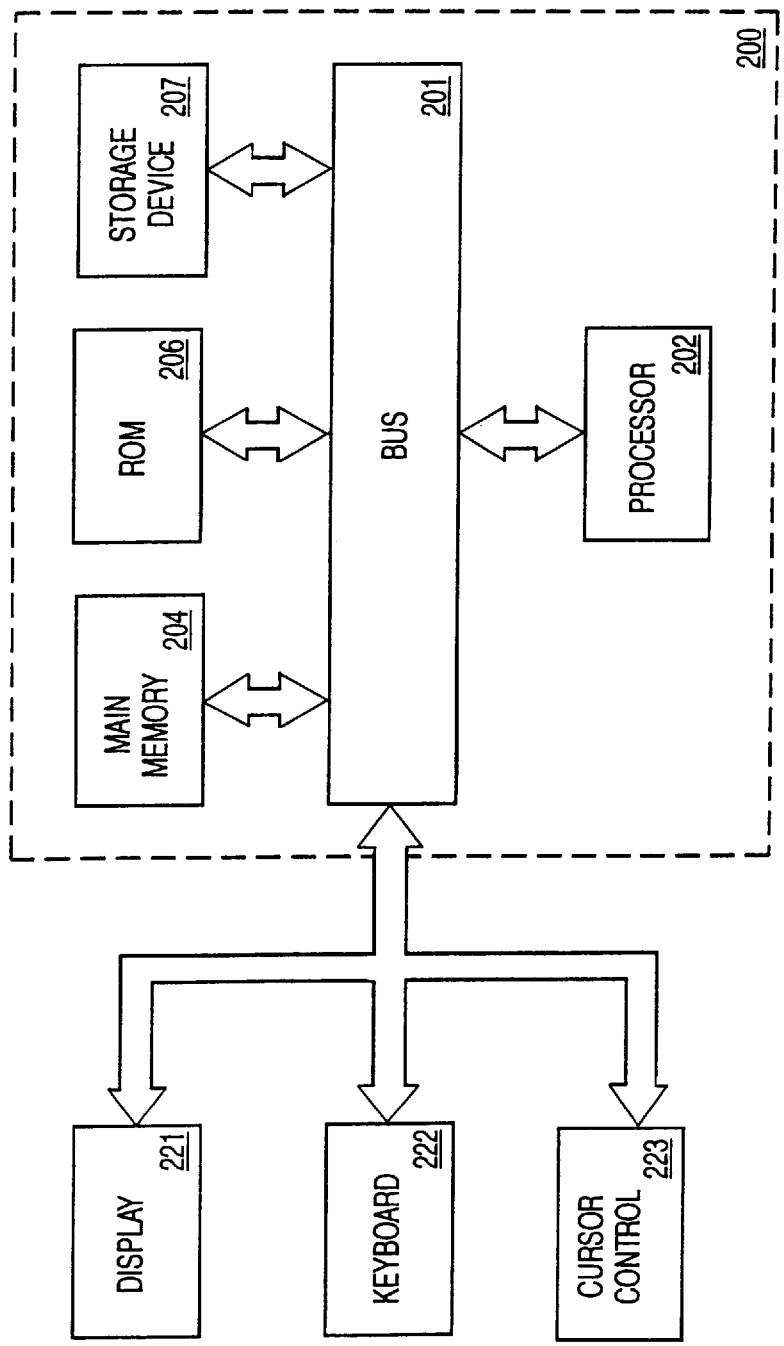
FIG. 2 illustrates a computer system which may be used to implement the present invention.

Referring to FIG. 2, the computer system 200 upon which an embodiment of the present invention can be implemented is illustrated. Computer system 200 comprises a bus 201 or other communication means for communicating information, and a processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202. Data storage device 207 is coupled to bus 201 for storing information and instructions.

A data storage device 207 such as a magnetic disk or optical disk and its corresponding disk drive can be coupled to computer system 200. Computer system 200 can also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

The present invention is related to the use of computer system 200 to parallelize database operations that write data to the database. According to one embodiment, write operations are parallelized by computer system 200 in response to processor 202 executing sequences of instructions contained in memory 204. Execution of the sequences of instructions contained in memory 204 causes processor 202 to divide write operations into multiple work granules which are executed as will be described hereafter. In alternative embodiments, hard-wired circuitry may be used in place of or in combination with software instructions to implement the present invention. Thus, the present invention is not limited to any specific combination of hardware circuitry and software.

PARALLELIZING OPERATIONS THAT INCLUDE WRITING DATA INTO A DATABASE

As explained above, database operations that write a particular set of data into the database are typically performed by only one process at a time, because only one process can hold the exclusive lock that grants the exclusive right to access the particular set of data. Such operations are collectively referred to herein as write operations. Write operations include, for example, operations that change existing values, operations that insert new values into existing sets of data, operations that create new sets of data, and operations that delete existing values or existing sets of data.

Database statements that require write operations typically include processing steps that precede the actual step of storing data into the database. Specifically, preliminary steps of creating, re-arranging, or collecting the data that is to be written to the database must be performed before the data is written to the database. According to an embodiment of the invention, a coordinator process divides operations that include writing data into a database into multiple sets of work granules, where each set of work granules is composed of work granules that can be performed in parallel with respect to each other. The coordinator process may assign the work granules to multiple processes so that the work granules may be executed in parallel to take advantage of the processing power of a multi-processing system.

According to one embodiment of the invention, one or more sets of work granules are created for performing the preliminary steps of an operation that requires writing data into a database (collectively referred to as the "data generation" steps). The data generated during the execution of the work granules associated with the data generation steps are stored in a table queue that is maintained separate from the database itself. A table queue is a communication abstraction that encapsulates the data flow and partitioning functions. A table queue partitions its input to its output according to the needs of a consumer.

The coordinator process creates a set of work granules for loading data from a table queue into a database. The "loading" work granules are assigned to a set of processes. Each process assigned a loading work granule reads data from the table queue and writes the data to a distinct subset of data within the database. Because each process is performing the data loading portion of the write operation for a distinct subset of the data, the processes do not have to compete for control of an exclusive lock with other processes working on other portions of the same operation.

According to one embodiment, work that cannot be parallelized is performed by the coordinator process itself. Thus, after a set of processes load partitions of a table into a database, the coordinator process performs the final merging of the partitions of the table. The coordinator process may also assign itself work granules from other sets of work granules. The present invention is not limited to any particular distribution technique of work between the coordinator process and other processes.

Figure 3:
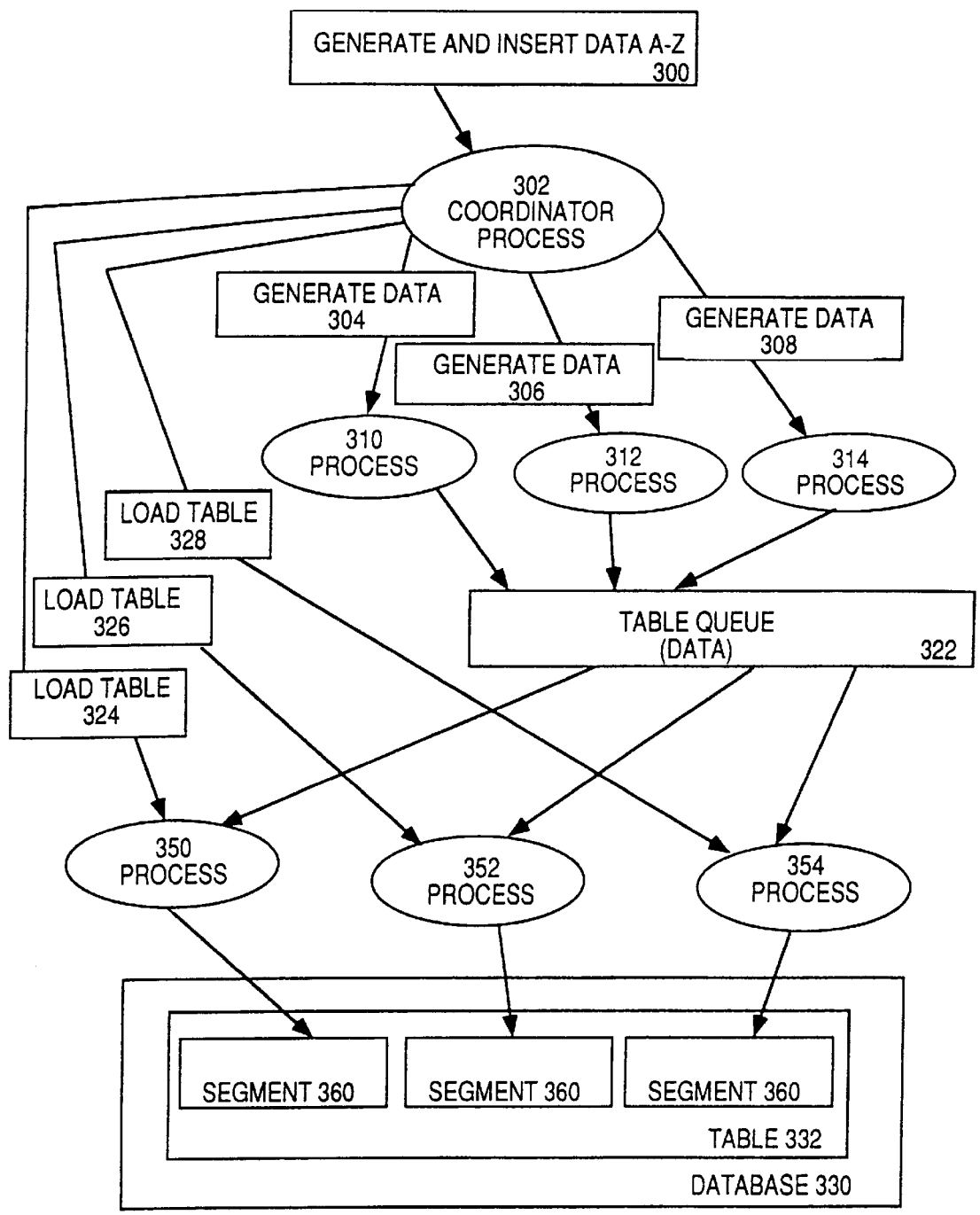
FIG. 3 illustrates a computer system in which parallel processes are used to create portions of a table according to one embodiment of the invention.

FIG. 3 is a block diagram illustrating how, according to an embodiment of the invention, a write operation is divided into work granules, and how the work granules are distributed. In the illustrated example, the initial statement 300 involves the creation of a set of data (DATA A–Z) and the insertion of the data into a table 332. A coordinator process 302 receives statement 300 and obtains a lock on the table 332. The coordinator process 302 then divides the query up into two sets of work granules. The first set of work granules includes work granules 304, 306 and 308, which are assigned to processes 310, 312 and 314, respectively. The second set of work granules consists of work granules 324, 326 and 328, which are assigned to processes 350, 352 and 354, respectively.

Each of work granules 304, 306 and 308 requires the generation of a fraction of the data A–Z that will ultimately be inserted into a table 332. However, the work granules 304, 306 and 308 do not include a step of inserting the data into table 332. Rather, each work granule 304, 306 and 308 specifies that the data generated during the performance of the work granule is to be sent to a common table queue 322. Because work granules 304, 306 and 308 do not involve writing data into the database 330, they may be executed simultaneously.

Figure 1:
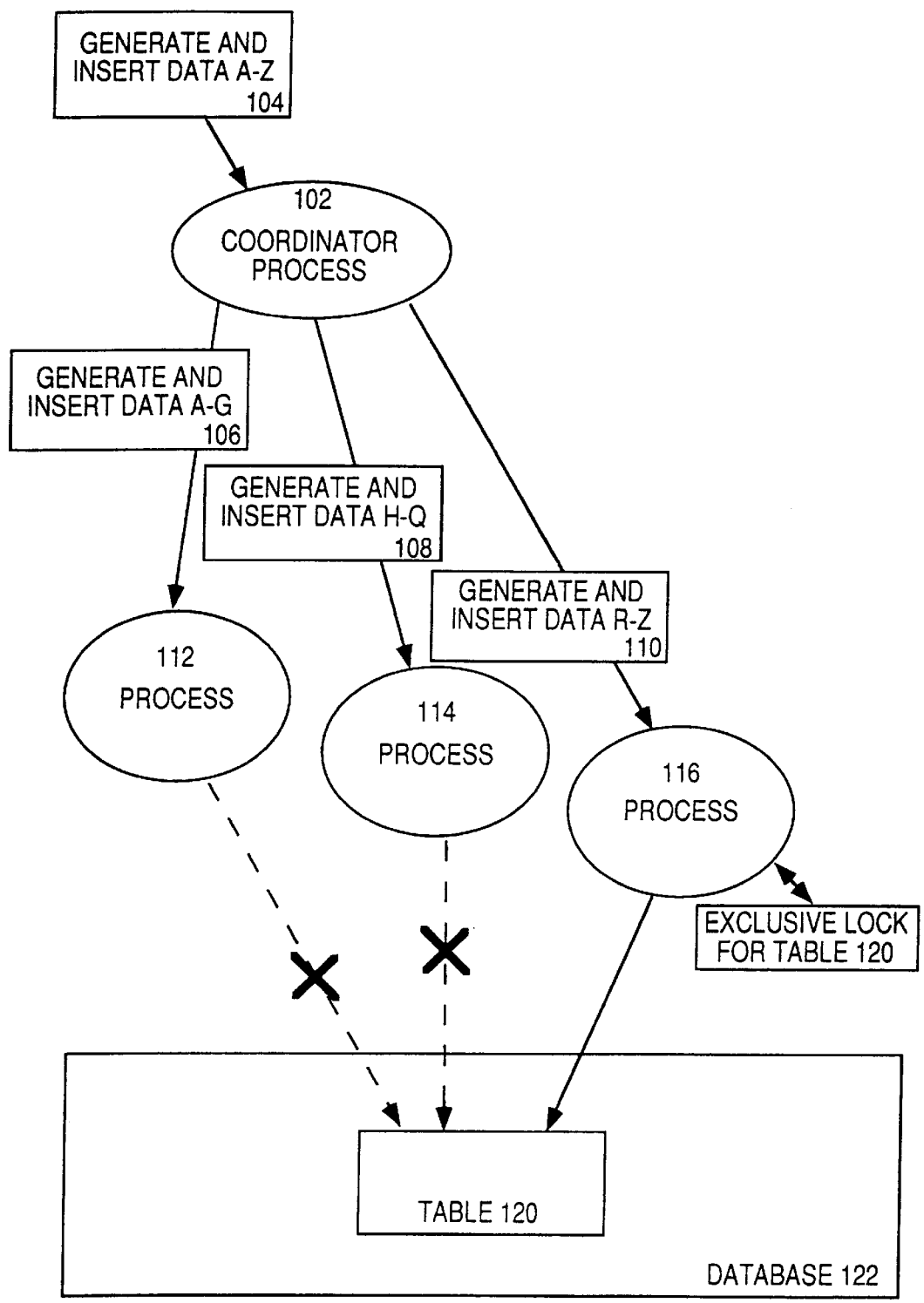
FIG. 1 illustrates a database system in which multiple processes are attempting to write to the same table.

During the performance of the first set of work granules, table queue 322 will receive all of the data A–Z to be written to table 332. Coordinator process 302 then assigns the "load table" work granules 324, 326 and 328 to processes 350, 352 and 354. Specifically, each of processes 350, 352 and 354 is assigned to load data from the table queue 322 into distinct segments of the database 330. Before loading data into the database, processes 350, 352 and 354 obtain exclusive locks for the portion of the database to which they are writing. However, since the processes 350, 352 and 354 are writing to distinct segments, they do not have to compete with each other for locks on the segments to which they are writing. Therefore, the data A–Z may be loaded into the database 330 more efficiently by processes 350, 352 and 354 than by processes 112, 114 and 116 of FIG. 1, where many processes must compete for an exclusive lock on the same set of data.

In the example illustrated in FIG. 3, processes 350, 352 and 354 write data to segments 360, 362 and 364 of table 332, respectively. After processes 350, 352 and 354 have completed their respective load operations, the coordinator process 302 merges the loaded segments 360, 362 and 364 to form the table 332, and makes the table permanent in the database. The processes 350, 352 and 354 then release the locks they have on the individual segments.

PARALLEL CREATE TABLE AS SELECT

A create table as select operation is a type of write operation in which a new table is created from data that satisfies an arbitrary query. For example, the statement CREATE TABLE t2 AS SELECT * FROM t1 may be used to create a new table "t2" that includes rows copied from an existing table "t2". The symbol "*" indicates that all fields in t1 are to be copied into t2.

In the following discussion, the parallelization of a create table as select operation shall be described with reference to a query that calls for the table to be populated from data located in a pre-existing table, such as the above-listed query. However, the data used to populate a table created with the "create table as select" statement is any data that satisfies the select clause of the statement. Such data need not reside in a pre-existing table.

A create table as select operation is functionally similar to a "create table" operation followed by an "insert select" operation that inserts existing data into the newly created table. The "select" clause identifies the sources from which the preexisting data is to be copied. However, when a create table as select operation is used, the new table automatically inherits the names and data types of the data selected by the query. Therefore, the user does not have to explicitly specify the columns and data types for the new table as would otherwise be necessary with a conventional create table operation.

According to an embodiment of the invention, a parallel create table as select operation is performed in multiple phases. During the first phase, the task of collecting the data specified in the select statement is divided into work granules which are distributed among multiple processes. The execution of a data collection work granule requires access to the database, but does not require writes to be made to the database. Consequently, an exclusive mode lock is not required for each process to perform its assigned work granule. As a result, all of the processes participating in the data collection phase of the parallel create table as select operation can concurrently read from table t1.

Each process involved in the data collection phase of a parallel create table as select operation sends the data that it collects to a table queue that is separate from the database. In the second phase of the parallel create table as select operation, the task of loading the collected data into the database is divided into work granules which are distributed among multiple processes. Each of the processes sends from the table queue into the database a distinct partition of the table that is to be created. Once the partitions have been loaded, a single process merges the table partitions to create the new table.

DIRECT WRITE WITH NO-LOGGING

A database is in a transaction consistent state when the database reflects (1) all of the changes made by a particular set of transactions that have completed successfully, and (2) no partial changes made by any other transactions. Thus, for any given transaction, the database must reflect all changes made by the transaction or no changes made by the transaction. Consequently, while a transaction is writing to the database, the transaction also generates and stores undo records that can be used to undo the changes in case the transaction is unable to complete successfully. For example, if a transaction that made changes to the database cannot be completed due to deadlock, the transaction must be "rolled back". When a transaction is rolled back, the changes made by the transaction are be removed from the database using the undo records generated during the performance of the changes.

In some database systems, transactions that write the database store changes to the database in a buffer cache located in dynamic memory. The buffer cache is shared among all of the transactions that access the database. When a transaction makes a change to data in the database, the transaction stores the written data in the buffer cache and generates an undo log record and a redo log record of the change. These log records are stored on a static storage device. If a crash occurs, the log records are used to recover the database to a transaction consistent state.

Specifically, the undo log record is used for removing a change made by the transaction if the transaction does not complete successfully prior to a crash, as described above. The redo record is used to record the change. If the transaction successfully completes but the database crashes before the modified data in the buffer cache is written to disk, the modified data in the buffer cache will be lost. Under these circumstances, the redo log is used to update the database to reflect the changes made by the transaction.

According to one embodiment of the invention, a transaction performing a parallel create table as select operation avoids the overhead inherent in the buffer cache and logging generation by causing the generated table to be written directly to disk without using the buffer cache and without generating and storing undo log records. Because the entire created table is loaded to the disk in an atomic operation, the database will either be loaded with the entire table, or it will not contain any of the table. In either situation, the database will be in a transaction consistent state, so the generation of undo log records is not necessary.

PARALLEL CREATE TABLE AS SELECT EXAMPLE

The execution of a parallel create table as select operation has been generally described above. For the purposes of example, FIGS. 4–6 shall be used to describe the specific steps of a parallel create table as select operation in a database system that uses the query parallelization techniques described in U.S. patent application Ser. No. 80/441,527, entitled "Method and Apparatus for Implementing Parallel Operations in a Database Management System", the contents of which are incorporated herein by reference. However, the present invention is not limited to any particular techniques for parallelizing execution of database operations.

Figure 4:
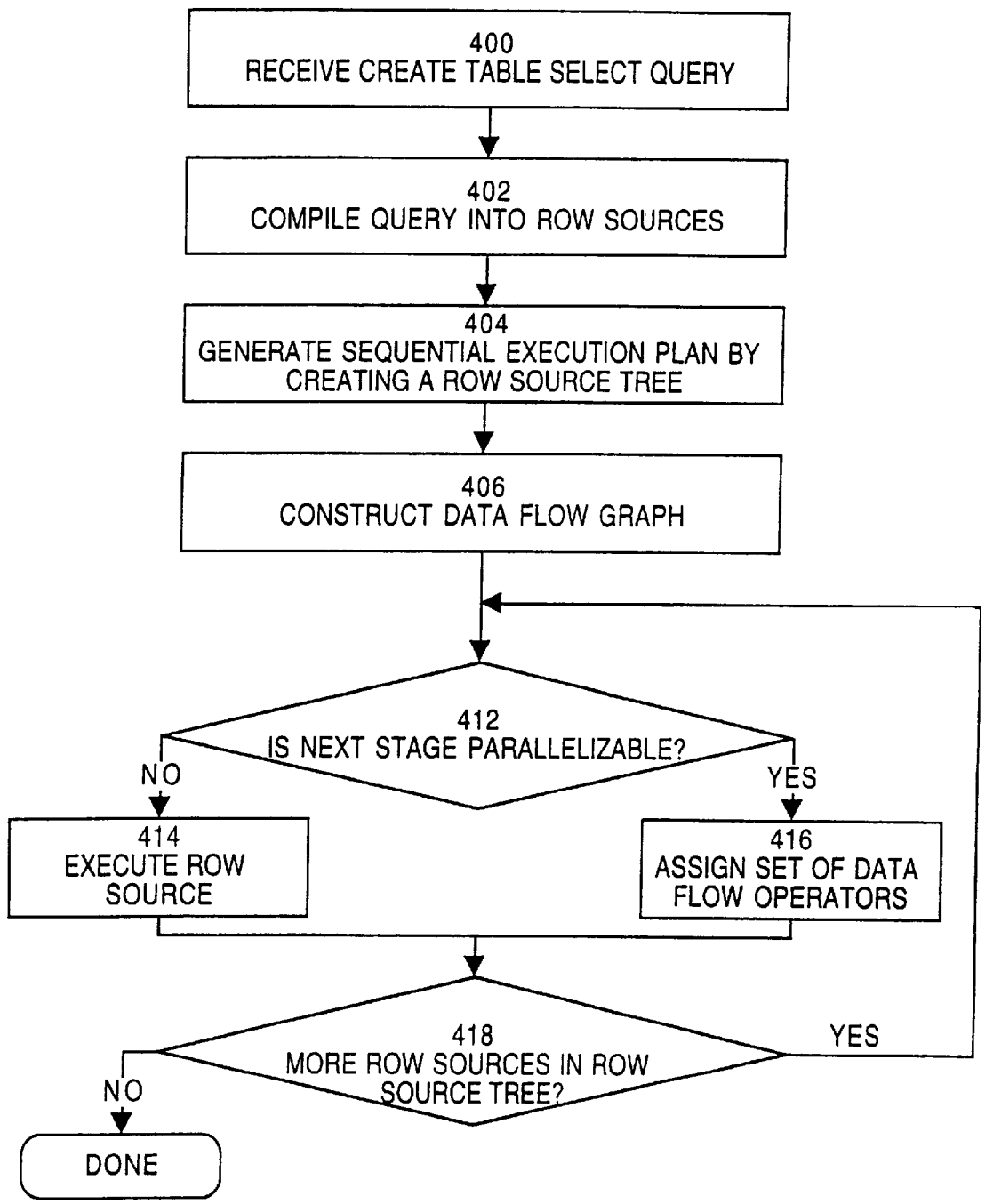
FIG. 4 is a flow chart illustrating the steps to perform a parallel create table as select operation according to an embodiment of the invention.
Figure 5:
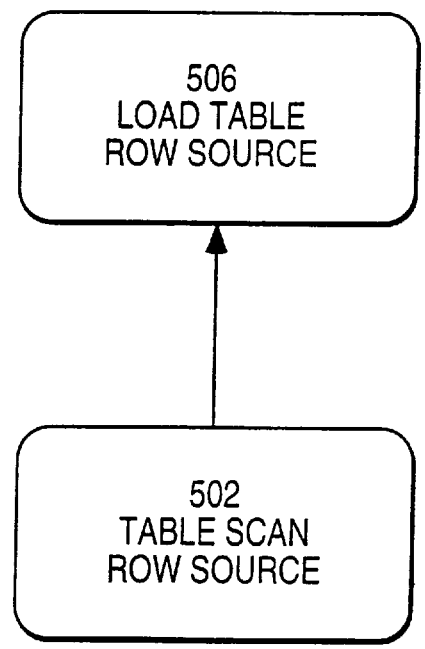
FIG. 5 illustrates a row source tree that may be generated in response to a parallel create table as select operation according to an embodiment of the invention.

Referring to FIG. 4, the database receives a create table as select statement at step 400. At step 402, the create table as select query is compiled. During the compilation process, the query is decomposed into its constituent parts. The smallest constituent parts of the query are referred to as "row sources". Each row source is a work granule that may be executed by a set of processes. For example, the create table as select statement:

CREATE TABLE t2 AS SELECT * FROM t1 may be decomposed into (1) a row source for performing a table scan of table t1, and (2) a row source for loading into the database segments of the new table t2. Once the segments of the new table have been loaded, the segments are merged to create table t2.

At step 404, a sequential plan of query execution is generated. The plan may take the form of a row source tree, where the row sources identified in step 402 are connected to form a tree-like structure. In the present example, the row source tree 500 illustrated in FIG. 5 may be generated as the query execution plan. Row source tree 500 includes a Table Scan row source 502 feeding a Load Table row source 506.

Table Scan row source 502 is an operation for reading all of the rows of table t1 and making copies of the rows in dynamic memory. Load Table row source 506 is an operation for loading segments of a table into a database. Once loaded, the segments may be merged to create the table.

More specifically, the Load Table row source 506 allocates a unit of database table storage (a "table segment") which is marked "temporary". The Load Table row source 506 then fills the table segment with rows retrieved from a table queue. The table segment is extended as necessary to accommodate as many rows as are required (or until storage resources associated with the database are exhausted).

Rather than use the format with which rows are processed by the other row sources in a query plan, the Load Table row source 506 stores the rows in the table segment in the exact format in which table rows are stored persistently in the database. The process of "inserting" rows into the table segment causes the rows to be physically written to disk in exactly the format that rows of a table are normally stored in the database. Due to buffering, the storage of the rows on the physical disk may not be immediate.

The table segment is marked "temporary" so that if any part of the operation fails, the storage associated with the segment can later be reclaimed by other database operations. A table persistently stored in the database can be composed of multiple such segments.

Once the Load Table row source 506 finishes writing the table segment, the Load Table row source 506 returns to the caller of the entire row source tree an "address" or "handle" of the segment and the number of rows in the segment. According to one embodiment, this caller is not itself another row source, but a top level component of the database system which is responsible for driving the overall CREATE TABLE operation. When the row source is transformed into a DFO tree and computed in parallel, as shall be described hereafter, this caller is implemented in the coordinator process.

Figure 6:
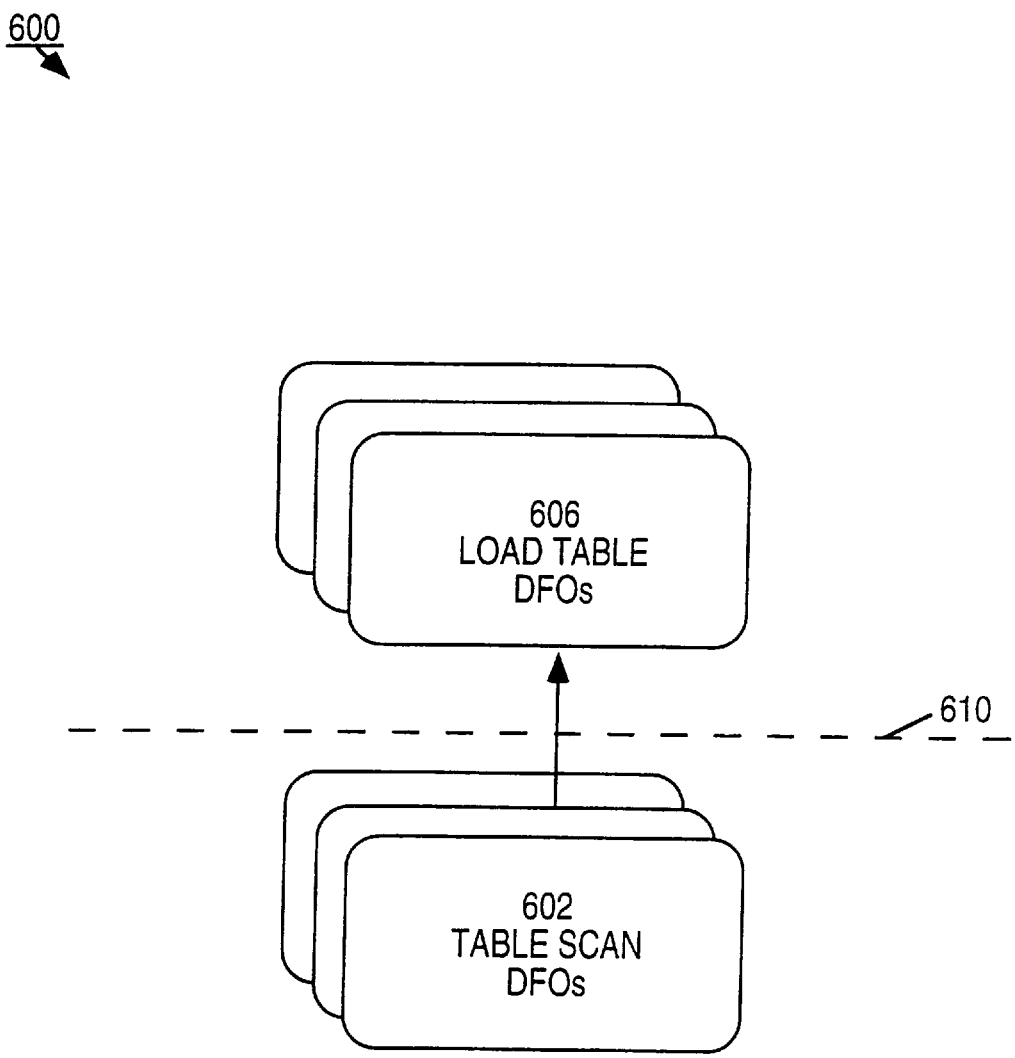
FIG. 6 illustrates a data flow operator tree that may be generated based on the row source tree of FIG. 5, according to an embodiment of the invention.

After the sequential query execution plan is generated, a data flow graph is constructed (step 406) from the row source tree using a parallelizing mechanism such as that described in U.S. patent application Ser. No. 08/441,527 entitled "Method and Apparatus for Implementing Parallel Operations in a Database Management System" filed on May 15, 1995, by Gary Hallmark and Daniel Leary. FIG. 6 illustrates a Data Flow Operator ("DFO") tree that may be generated based on the row source tree of FIG. 5 according to an embodiment of the invention.

The DFO tree 600 of FIG. 6 includes Table Scan DFOs 602 and Load Table DFOs 606. Table Scan DFOs 602 and Load Table DFOs 606 correspond to Table Scan row source 502 and Load Table row source 506, respectively. The Load Table DFOs 606 are comprised of the Load Table row source 506, together with the additional information required by any DFO (e.g., partitioning requirements, parallelizability) and as described in the incorporated U.S. patent application Ser. No. 08/441,527 entitled "Method and Apparatus for Implementing Parallel Operations in a Database Management System" filed on May 15, 1995, by Gary Hallmark and Daniel Leary.

Based on the DFO tree 600, the create table as select operation has been divided into two stages. Data produced at the first stage flows to the second stage.

After a DFO tree has been constructed, a coordinator process causes the query to be executed based on the row source tree and the DFO tree. At step 412, the coordinator process determines whether the current stage of the execution process is parallelizable. If the current stage is not parallelizable, then the coordinator process executes the row source associated with the current stage. If the current stage is parallelizable, the coordinator process assigns the DFOs to a set of processes at step 416. Each process that has been assigned a DFO generates a row source based on the DFO and executes the row source. This process is repeated until all stages of the query have been executed.

In the present example, the coordinator process assigns the Table Scan DFOs 602 to a set of processes for execution during the first stage of the create table as select operation. Each process assigned one of Table Scan DFOs 602 performs a table scan operation. The output of processes that execute the Table Scan DFOs 602 are used as input for the processes that participate in the next stage of the create table as select operation.

A table queue encapsulates the data flow and partitioning functions between the processes executing one DFO ("producer processes") and the processes executing the following DFO ("consumer processes"). The input function of a table queue is determined by the partitioning type used by the producer processes. A table queue partitions its input to its output according to the needs of the consumer processes.

For any given table queue, the relationship between producer processes and consumer processes may be one-to-many, many-to-one, or many-to-many. During the execution of the process represented by the DFO tree 600 of FIG. 6, one or more processes executing Table Scan DFOs 602 send data into a first table queue. One or more processes executing the Load Table DFOs 606 receive data from the first table queue as input data. The processes executing the Load Table DFOs 606 construct table segments from the data retrieved from the first table queue.

For the next stage of the create table as select operation, the coordinator process obtains a lock on the table to be created, and assigns the Load Table DFOs 606 to a set of processes for execution. The processes that execute the Load Table DFOs 606 use as input the output of the processes that execute the Table Scan DFOs 602. The processes that execute the Load Table DFOs 606 obtain locks on the segments to which they will write, and load rows into the segments that will ultimately be combined to form the new table.

The locks obtained by processes executing the Load Table DFOs 606 prevent other processes from using the segments for other purposes. The table lock held by the coordinator process does not prevent the processes that are executing the Load Table DFOs 606 from writing to their respective segments, since the segments are not yet part of the table.

If the user specified CHECK constraints (including the NOT NULL constraint) in the parallel create table as select statement, then these constraints can be enforced by the load table row source and hence are enforced in parallel by the load table DFO. A check constraint declares that for each row of a table, some user-specified predicate which applies to the values of one or more columns of that row, must evaluate to true. In order to enforce this constraint, the load table row source applies the predicate to each row obtained from its input row source prior to inserting the row into its temporary segment. If the predicate fails, then an error is signaled to the user, the operations abort, and the transaction is rolled back.

Each process executing a Load Table DFO informs the coordinator process when it has written its last row to the segment. After all the Load Table DFOs 606 have completed, the coordinator process merges the segments to create a table. The process of merging individual segments is relatively computationally inexpensive to perform. The work required to merge the segments does not, in particular, grow as the size of the segment contents grows (but rather as the number of segments grows).

The coordinator process then changes the status of the merged segments from "temporary to permanent". The status of the resulting merged segments can be changed from "temporary" to "permanent" status inexpensively and without requiring work on the order of the size of the segment contents. Once the segments have been made permanent, the processes that performed the Load Table DFOs 606 release their locks on the segments.

DATABASE ARCHITECTURE

Multi-processing computer systems typically fall into three categories: shared everything systems, shared disk systems, and shared nothing systems. The constraints placed on the coordinator process during the work granule distribution process vary based on the type of multi-processing system involved. The magnitude of the work performed by the coordinator process is not based on the size of the task to perform, but is proportional to the number of segments into which the task is divided.

In shared everything systems, processes on all processors have direct access to all dynamic memory devices ("memory") and to all persistent memory devices ("disks") in the system. Consequently, a coordinator process in a shared everything system has few constraints with respect to how work granules may be assigned.

In shared disk systems, processors and memories are grouped into nodes. Each node in a shared disk system may itself constitute a shared everything system that includes multiple processors and multiple memories. Processes on all processors can access all disks in the system, but only the processes on processors that belong to a particular node can directly access the memory within the particular node.

In shared nothing systems, all processors, memories and disks are grouped into nodes. In shared nothing systems as in shared disk systems, each node may itself constitute a shared everything system or a shared disk system. Only the processes running on a particular node can directly access the memories and disks within the particular node. Of the three general types of multi-processing systems, shared nothing systems typically require the least amount of wiring between the various system components. However, shared nothing systems are the most susceptible to unbalanced workload conditions. For example, all of the data to be accessed during a particular work granule may reside on the disks of a particular node. Consequently, only processes running within that node can be used to perform the work granule, even though processes on other nodes remain idle.

This invention does not require the database system to be shared-nothing. Thus, the table that is created as a result of the parallel create table as select statement may or may not be physically partitioned on distinct nodes or disks of the database system. Further, each individual segment populated by the processes executing the Load Table DFO does not need to be physically confined to a specific disk device, since it might be striped over multiple devices.

In the foregoing specification, the invention has been described with reference to specific embodiments thereof It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing a statement that requires generation of a set of data that is to be written to a database, the method comprising the steps of:

receiving said statement;

generating a first set of work granules in response to said statement;

assigning said first set of work granules to a first set of processes to cause said first set of processes to write subsets of said set of data to a plurality of segments within the database, wherein more than one process of said first set of processes is able to access at least one segment of said plurality of segments, and no more than one process in said first set of processes writes to any segment of said plurality of segments; and merging said plurality of segments to create said set of data.

2. The method of claim 1 wherein:

a plurality of processes write data to said database through a shared buffer cache; and said first set of processes write said subsets directly to said plurality of segments without using said shared buffer cache.

3. The method of claim 2 wherein said first set of processes write said subsets to said plurality of segments without generating an undo log record for removing said subsets from said database.

4. The method of claim 1 wherein said first set of processes write said subsets directly to said segments within said database without generating an undo log record for removing said subsets from said database.

5. The method of claim 1 wherein the method further comprises the steps of:

reading a second set of data from said database; and generating said subsets, by said first set of processes, from said second set of data.

6. The method of claim 5 wherein the step of reading the second set of data from said database includes the steps of:

generating a second set of work granules in response to said statement; and assigning said second set of work granules to a second set of processes to cause each of said second set of processes to read a portion of said second set of data from said database.

7. The method of claim 6 further comprising the steps of:

causing said second plurality of processes to transmit said second set of data to a table queue; and causing said first set of processes to receive said second set of data from said table queue.

8. The method of claim 5 wherein:

the step of reading said second set of data includes reading data from one or more tables identified in said statement; and the step of merging said plurality of segments to create said set of data comprises the step of merging said plurality of segments to create a table.

9. A method for creating a second set of data in a database that contains a first set of data, the method comprising the steps of:

receiving a statement that identifies said first set of data;

causing a first plurality of processes to read said first set of data from said database and store said first set of data in dynamic memory, wherein each process of said first plurality of processes reads a separate portion of said first set of data from the database;

causing each process of a second plurality of processes to read a portion of said first set of data from dynamic memory and to write said portion to a distinct segment of the database; and merging the segments written to by said second plurality of processes to create said second set of data.

10. The method of claim 9 wherein:

the step of receiving said statement is performed by a first process;

the first process creates a first set of work granules and a second set of work granules in response to said statement;

the first process assigns said first set of work granules to said first plurality of processes to cause said first plurality of processes to read said first set of data; and the first process assigns said second set of work granules to said second plurality of processes to cause said second plurality of processes to write said portions to said distinct segments.

11. The method of claim 10 wherein the step of merging the segments written to by said second plurality of processes is performed by a single process.

12. The method of claim 11 wherein the step of merging the segments written to by said plurality of processes is performed by said first process.

13. The method of claim 9 wherein:

the step of causing a first plurality of processes to read said first set of data from said database comprises the step of causing said first plurality of processes to read data from one or more tables in said database; and the step of merging the segments written to by said second plurality of processes includes merging the segments into a table.

14. The method of claim 9 wherein:

a plurality of processes read and write data to said database through a shared buffer cache; and the step of writing portions to said segments is performed by writing the portions directly to the database without using the shared buffer cache.

15. The method of claim 9 wherein the step of writing said portions into the database is performed without generating an undo log record that indicates how to remove the portions from the database.

16. The method of claim 14 wherein the step of writing said portions into the database is performed without generating an undo log record that indicates how to remove the portions from the database.

17. A computer-readable medium having stored thereon a plurality of sequences of instructions, the plurality of sequences of instructions including sequences of instructions which, when executed by one or more processors, cause the one or more processors to perform the steps of:

receiving a statement that identifies a first set of data in a database that resides on a static storage device;

causing a first plurality of processes to read said first set of data from said database and store said first set of data in dynamic memory, wherein each process of said first plurality of processes reads a separate portion of said first set of data from the database;

causing each process of a second plurality of processes to read a portion of said first set of data from dynamic memory and to write to a distinct segment of the database a portion of said second set of data from said first set of data; and merging the segments generated by said second plurality of processes to create said second set of data.

18. The computer-readable medium of claim 17 further including instructions for:

causing said second plurality of processes to write said portions to segments of said database that are marked as temporary; and marking said segments of said database as permanent after merging the segments written by said second plurality of processes.

19. The computer-readable medium of claim 17 further including instructions for causing a single process to perform the step of merging the segments to create said second set of data.

20. The computer-readable medium of claim 19 wherein the sequence of instructions for causing each process of a second plurality of processes to write to a distinct segment of that database includes instructions for writing said portion of the second set of data directly to a segment of the database without generating a log for removing the said portion of said second set of data from the database.

* * * * *